United States Patent
Chen et al.

(10) Patent No.: US 7,650,385 B2
(45) Date of Patent: Jan. 19, 2010

(54) ASSIGNING PRIORITIES

(75) Inventors: James Chien-Chiung Chen, Tucson, AZ (US); Gail Andrea Spear, Tucson, AZ (US); Minh-Ngoc Le Huynh, San Jose, CA (US); Chung Man Fung, San Francisco, CA (US); Patricia Ching Lu, Fremont, CA (US); Dung Dang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 10/719,071

(22) Filed: Nov. 20, 2003

(65) Prior Publication Data

US 2005/0114460 A1    May 26, 2005

(51) Int. Cl.
*G06F 15/16* (2006.01)
*G06F 15/173* (2006.01)

(52) U.S. Cl. .................. 709/207; 709/240
(58) Field of Classification Search ............. 709/207, 709/240
See application file for complete search history.

(56) References Cited

U.S. PATENT DOCUMENTS

| | | | | |
|---|---|---|---|---|
| 5,564,062 A * | 10/1996 | Meaney et al. | ............ | 710/244 |
| 5,574,934 A * | 11/1996 | Mirashrafi et al. | ......... | 709/207 |
| 6,189,079 B1 * | 2/2001 | Micka et al. | ............... | 711/162 |
| 6,792,557 B1 | 9/2004 | Takamoto et al. | | |
| 6,912,629 B1 * | 6/2005 | West et al. | ................. | 711/161 |
| 7,107,316 B2 * | 9/2006 | Brown et al. | ............... | 709/207 |
| 2003/0037117 A1 * | 2/2003 | Tabuchi | .................... | 709/207 |
| 2004/0143636 A1 * | 7/2004 | Horvitz et al. | ............. | 709/207 |
| 2005/0108565 A1 * | 5/2005 | Blea et al. | .................. | 713/200 |

FOREIGN PATENT DOCUMENTS

| | | |
|---|---|---|
| JP | 08-286836 | 11/1996 |
| JP | 10198607 | 7/1998 |
| JP | 2000-187559 | 7/2000 |
| JP | 2000347917 | 12/2000 |
| JP | 2002-073301 | 3/2002 |
| JP | 2002-278704 | 9/2002 |
| WO | 0129647 | 4/2001 |

OTHER PUBLICATIONS

Pate et al., "RAMAC Virtual Array: Implementing Peer-to-Peer Remote Copy", Dec. 1998, IBM, SG24-5338-00.*
Patent Abstract and Translation for JP10198607, published on Jul. 31, 1998, 26 pp.
Patent Abstract and Translation for JP2000347917, published on Dec. 15, 2000, 22 pp.
Patent Abstract and Translation for WO0129647, published on Apr. 26, 2001, 7 pp.
Mikami, H.,"Information Materials for IDS" Apr. 11, 2008, 1 pg.

* cited by examiner

*Primary Examiner*—Kenny S Lin
(74) *Attorney, Agent, or Firm*—Janaki K. Davda; Konrad Raynes & Victor LLP

(57) ABSTRACT

Disclosed is a technique for assigning priorities. A request to manipulate data is received. A type of the request is determined. A priority is assigned to the request based on the type of the request.

24 Claims, 7 Drawing Sheets

ASSIGNING PRIORITIES

BACKGROUND OF THE INVENTION

1. Field of the Invention

The present invention is directed to assigning priorities to requests that manipulate (e.g., update or copy) data.

2. Description of the Related Art

Disaster recovery systems typically address two types of failures, a sudden catastrophic failure at a single point in time or data loss over a period of time. In the second type of gradual disaster, updates to volumes on data storage may be lost. To assist in recovery of data updates, a copy of data may be provided at a remote location. Such dual or shadow copies are typically made as the application system is writing new data to a primary storage device at a primary storage subsystem. The copies are stored in a secondary storage device at a secondary storage subsystem.

Typically, priorities are assigned to requests that manipulate (e.g., update or copy) data in volumes stored in the primary storage device. The requests may also be referred to as I/O requests. Since the priority assigned to each request is used by a resource manager at the primary and secondary storage subsystems to govern how resources (e.g., processor power for processing the I/O requests, memory for storing data, and hardware to perform data movement) should be allocated to execute a request, if the same request is processed in the primary and secondary storage subsystems with different priorities, the resources in both the primary may not be efficiently managed and can cause resource constraints.

For example, if the primary storage subsystem handles certain requests with high priority, and the secondary storage subsystem handles the same requests with a lower priority, these requests may not be able to finish within a reasonable amount of time because they will be waiting for the secondary storage subsystem to complete requests with higher priority.

Thus, even though most of the resources in the primary storage subsystem are dedicated to handle these requests, they are treated differently at the secondary storage subsystem.

On the other hand, when the primary storage subsystem handles certain requests with low priority, and the secondary storage subsystem handles these requests with a higher priority, the secondary storage subsystem may not have enough resources to finish higher priority requests from the primary storage subsystem in a reasonable amount of time.

Thus, there is a need in the art for storage subsystems to effectively manage their resources to reduce I/O response time and increase overall system throughput.

SUMMARY OF THE INVENTION

Provided are a method, system, and program for assigning priorities. A request to manipulate data is received. A type of the request is determined. A priority is assigned to the request based on the type of the request.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention apply consistent priorities to I/O requests at both a primary and a secondary control unit (e.g., storage subsystems).

Figure 1:
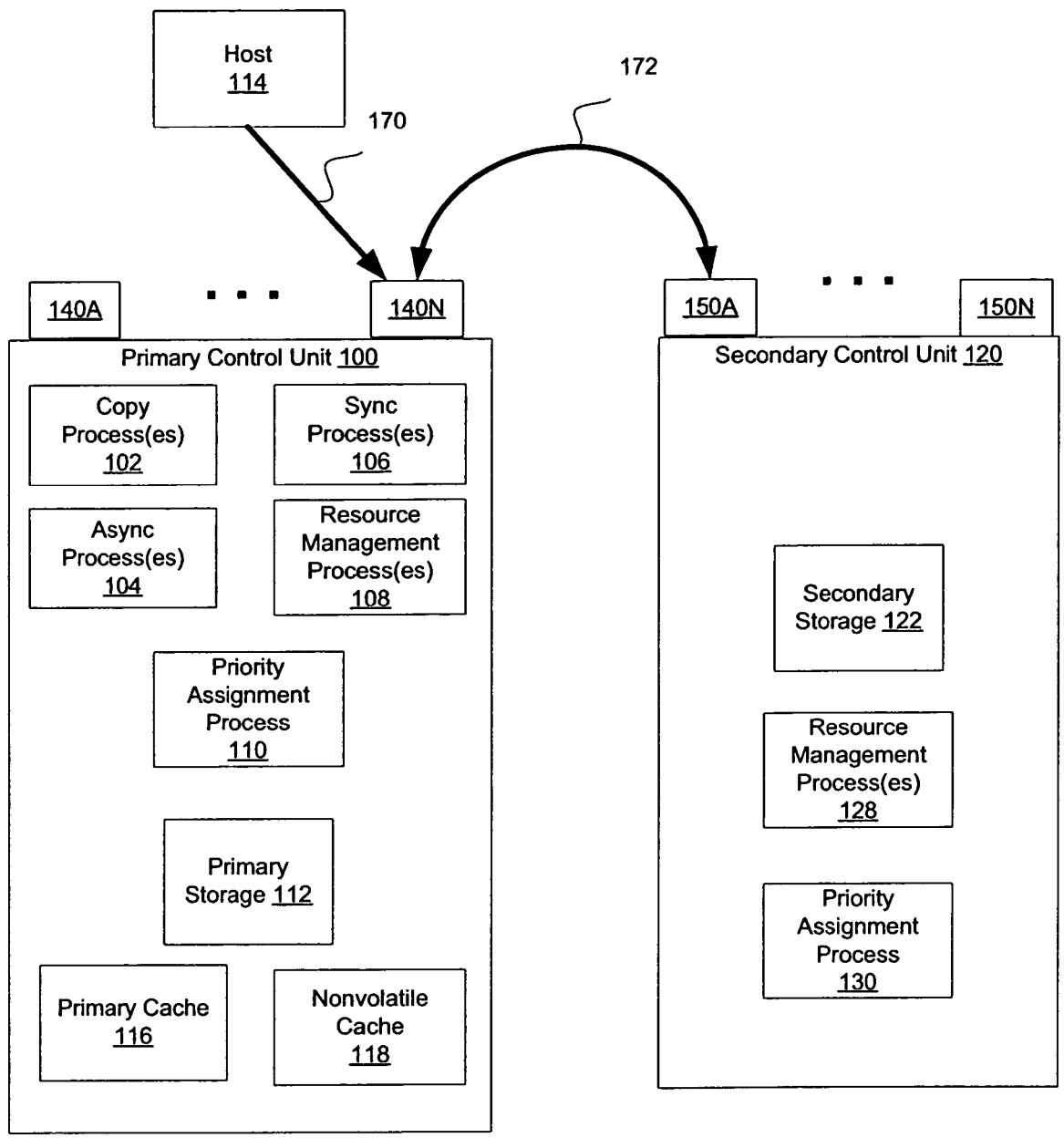
FIG. 1 illustrates, in block diagrams, a computing environment in accordance with certain implementations of the invention.

FIG. 1 illustrates, in block diagrams, a computing environment in accordance with certain implementations of the invention. A primary control unit 100 provides one or more hosts (e.g., host 114) access to primary storage 112, such as Direct Access Storage Device (DASD). The primary storage 112 may be divided into blocks of storage containing blocks of data, and the blocks of storage are further divided into sub-blocks of storage that contain sub-locks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The primary control unit 100 includes a primary cache 116 in which updates to blocks of data in the primary storage 112 are maintained until written to primary storage 112 (e.g., tracks are destaged). Primary cache 116 may be any type of storage, and the designation of cache illustrates only certain implementations. Additionally, the primary control unit 100 includes a nonvolatile cache 118. The non-volatile cache 118 may be, for example, a battery-backed up volatile memory, to maintain a non-volatile copy of data updates.

The primary control unit 100 may include one or more copy processes 102 (e.g., for executing an establish with copy command), one or more async processes (e.g., for executing an Peer-to-Peer Remote Copy (PPRC) Extended Distance or asynchronous PPRC copy command), and one or more sync processes 106 (e.g., for executing a synchronous PPRC copy command). Each of the processes 102, 104, and 106 transfers data from the primary control unit 100 to remote storage, such as storage at the secondary control unit 120. In certain implementations, the async process 104 runs continuously for PPRC Extended Distance and asynchronous PPRC commands, and the synch process 106 starts up and completes for a synchronous PPRC command. In certain implementations, there may be different async processes 104 for asynchronous PPRC and for PPRC Extended Distance).

International Business Machines Corporation (IBM), the assignee of the subject patent application, provides several remote mirroring systems, including, for example: a synchronous PPRC service, an asynchronous PPRC service, a PPRC Extended Distance service, or an establish with copy command in an Enterprise Storage Server® (ESS) system. For ease of reference, the synchronous Peer-to-Peer Remote Copy (PPRC) service, asynchronous PPRC service, and PPRC Extended Distance service will be described as providing synchronous PPRC, asynchronous PPRC, and PPRC Extended Distance commands.

The synchronous PPRC service provides a technique for recovering data updates that occur between a last, safe backup and a system failure with a synchronous PPRC command. Such data shadowing systems can also provide an additional remote copy for non-recovery purposes, such as local access at a remote site. With the synchronous PPRC service, a primary storage subsystem maintains a copy of predefined datasets on a secondary storage subsystem. The copy may be used for disaster recovery. Changes to data are copied to the secondary storage subsystem as an application updates the data. Thus, the copy may be used whether there are gradual and/or intermittent failures. The copy is maintained by intercepting write instructions to the synchronous PPRC dataset and generating appropriate write instructions from the primary storage system to the secondary storage system. The write instructions may update data, write new data, or write the same data again.

The synchronous PPRC service copies data to the secondary storage subsystem to keep the data synchronous with a primary storage subsystem. That is, an application system writes data to a volume and then transfers the updated data over, for example, Enterprise System Connection (ESCON®) fiber channels to the secondary storage subsystem. The secondary storage subsystem writes the data to a corresponding volume. Only when the data is safely written to volumes at both the primary and secondary storage subsystems does the application system receive assurance that the volume update is complete.

Thus, with synchronous PPRC commands, the copy at the secondary storage subsystem is maintained by intercepting write instructions to the dataset at the primary storage subsystem and generating appropriate write instructions from the primary storage system to the secondary storage system.

For synchronous PPRC, before the host 114 receives an acknowledgment of completion of the write process when writing a chain of tracks to the primary control unit 100, all tracks in the chain are also transferred to the secondary control unit 120 by a sync process 106.

Asynchronous PPRC and PPRC Extended Distance commands do not write to secondary storage subsystem before acknowledging the write to the primary storage subsystem. Instead, for the PPRC Extended Distance service, when a block of data is written, information is stored that indicates that the block of data is to be transferred to the secondary storage subsystem at a later time. An asynchronous process collects updates at the primary storage subsystem and sends the updates to the secondary storage subsystem.

For PPRC Extended Distance, the host 114 may complete writing a track to the primary control unit 100 without the track having been sent to the secondary control unit 120. After the track has been written to the primary control unit 100, the sync process 106 will discover that an indicator corresponding to the track is set to indicate that the track is out of sync with a corresponding track at the secondary control unit 120 and will send the track to the secondary control unit 120. That is, the track is sent asynchronously with respect to the track written by the host.

With an establish with copy command, a copy of a volume at the primary storage subsystem is made at the secondary storage subsystem during an initial copy relationship. After this, updates made to the volume at the primary storage subsystem may be copied to the corresponding copy of the volume at the secondary storage subsystem to keep the copies of the volume in sync.

The primary control unit 100 also includes one or more resource management processes 108 for managing resources and a priority assignment process 110 for assigning priorities to I/O requests.

In certain implementations, the processes 102, 104, 106, 108, and 110 are implemented as firmware. In certain implementations, the processes 102, 104, 106, 108, and 110 are implemented in a combination of firmware and software. In certain implementations, the processes 102, 104, 106, 108, and 110 are implemented as separate software programs for each process 102, 104, 106, 108, and 110. In certain implementations, the processes 102, 104, 106, 108, and 110 may be combined with each other or other software programs (e.g., the async processes 104 and sync processes 106 may be combined with each other).

Channel adaptors 140A ... 140N allow the primary control unit 100 to interface to channels. For ease of reference, A ... N are used to represent multiple components (e.g., 140A ... 140N). In certain implementations, channel adaptors 140A ... 140N may be Fibre channel adaptors.

Secondary control unit 120 allows access to disk storage, such as secondary storage 122, which maintains back-up copies of all or a subset of the volumes of the primary storage 112. Secondary storage may be a Direct Access Storage Device (DASD). Secondary storage 122 is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The secondary control unit 120 also includes one or more resource management processes 128 for managing resources and a priority assignment process 130 for assigning priorities to I/O requests. In certain implementations, the processes 128 and 130 are implemented as firmware. In certain implementations, the processes 128 and 130 are implemented in a combination of firmware and software. In certain implementations, the processes 128 and 130 are implemented as separate software programs for each process 128 and 130. In certain implementations, the processes 128 and 130 may be combined with each other or other software programs.

Channel adaptors 150A ... 150N allow the secondary control unit 120 to interface to channels. For ease of reference, A ... N are used to represent multiple components (e.g., 150A ... 150N). In certain implementations, channel adaptors 150A ... 150N may be Fibre channel adaptors.

Although for ease of illustration, only a communication paths 170 and 172 are illustrated, there may be communication paths between host 114 and each channel adapter 140A ... 140N and between channel adapters 140A ... 140N and channel adapters 150A ... 150N.

In certain implementations, communication path 172 between channel adapter 140N and 150A is bidirectional. Also, either control unit 100 or 120 may be designated a primary control unit, and the other control unit may be designated as a secondary control unit for certain commands. For example, control unit 100 may be designated as a primary control unit 120 for an asynchronous PPRC command, while control unit 120 may be designated as a primary control unit 120 for an establish with copy command (e.g., to make an initial copy of a volume).

Thus, a channel adaptor 140A . . . 140N may receive I/O requests from communication path 170 or communication path 172. In certain implementations, the I/O requests may include, for example, host I/O commands, asynchronous PPRC commands, Extended Distance PPRC commands, synchronous PPRC commands, and establish with copy commands. Implementations of the invention assign priorities to each of these I/O requests with the priority assignment processes 110 and 130.

The priority assignment processes 110 and 130 assign a priority to each I/O request based on the I/O type of the I/O request. In certain implementations, the I/O type refers to whether the I/O request is a host I/O command, an asynchronous PPRC command, an Extended Distance PPRC command, a synchronous PPRC command, or an establish with copy command. However, any type of I/O request falls within the scope of the invention.

In certain implementations, the primary control unit 100 and secondary control unit 120 communicate via communication paths, such as direct high speed transmission lines (e.g., an Enterprise System Connection (ESCON®)link). However, the communication paths may be comprised of any other communication means known in the art, including network transmission lines, fiber optic cables, etc., as long as the primary control unit 100 and secondary control unit 120 are able to communicate with each other.

In certain implementations, the primary control unit 100 and secondary control unit 120 may be comprised of the IBM®3990, Model 6 Storage Controller, Enterprise Storage Server®, or any other control unit known in the art, as long as the primary control unit 100 and secondary control unit 120 are able to communicate with each other.

In certain implementations, the primary control unit 100 and/or secondary control unit 120 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, and secondary storage.

In certain implementations of the invention, data is maintained in volume pairs. A volume pair is comprised of a volume in a primary storage device (e.g., primary storage 112) and a corresponding volume in a secondary storage device (e.g., secondary storage 122) that includes a consistent copy of the data maintained in the primary volume. For example, primary storage 112 may include VolumeA and VolumeB, and secondary storage 122 may contain corresponding VolumeX and VolumeY, respectively.

In certain implementations, removable and/or non-removable storage (instead of or in addition to remote storage, such as secondary storage 122) may be used to maintain back-up copies of all or a subset of the primary storage 112, and the techniques of the invention transfer data to the removable and/or non-removable storage rather than to the remote storage. The removable and/or nonremovable storage may reside at the primary control unit 100.

Figure 2A:
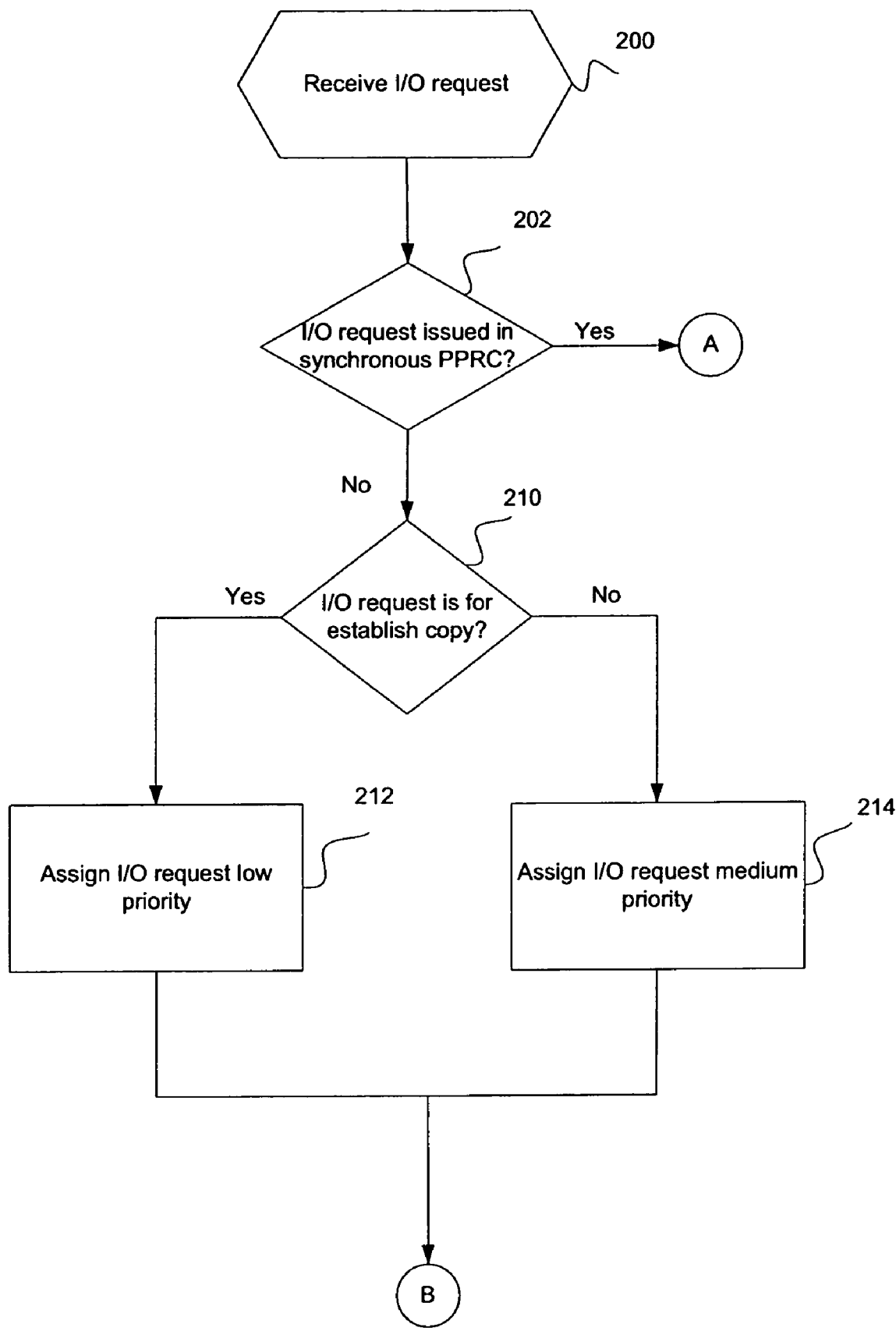
FIGS. 2A, 2B, and 2C illustrate logic implemented in a priority assignment process at a primary control unit in accordance with certain implementations of the invention.
Figure 2B:
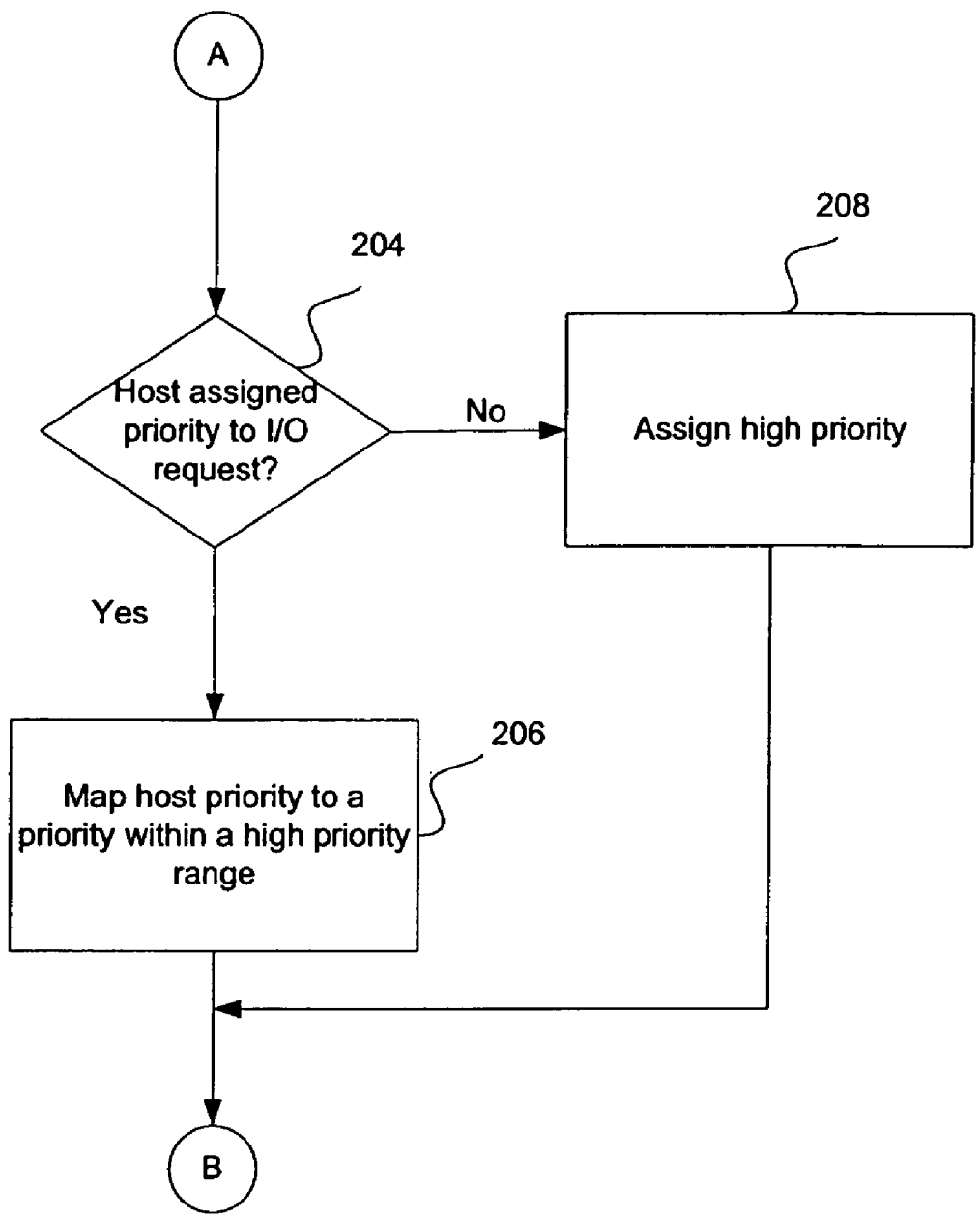
Figure 2C:
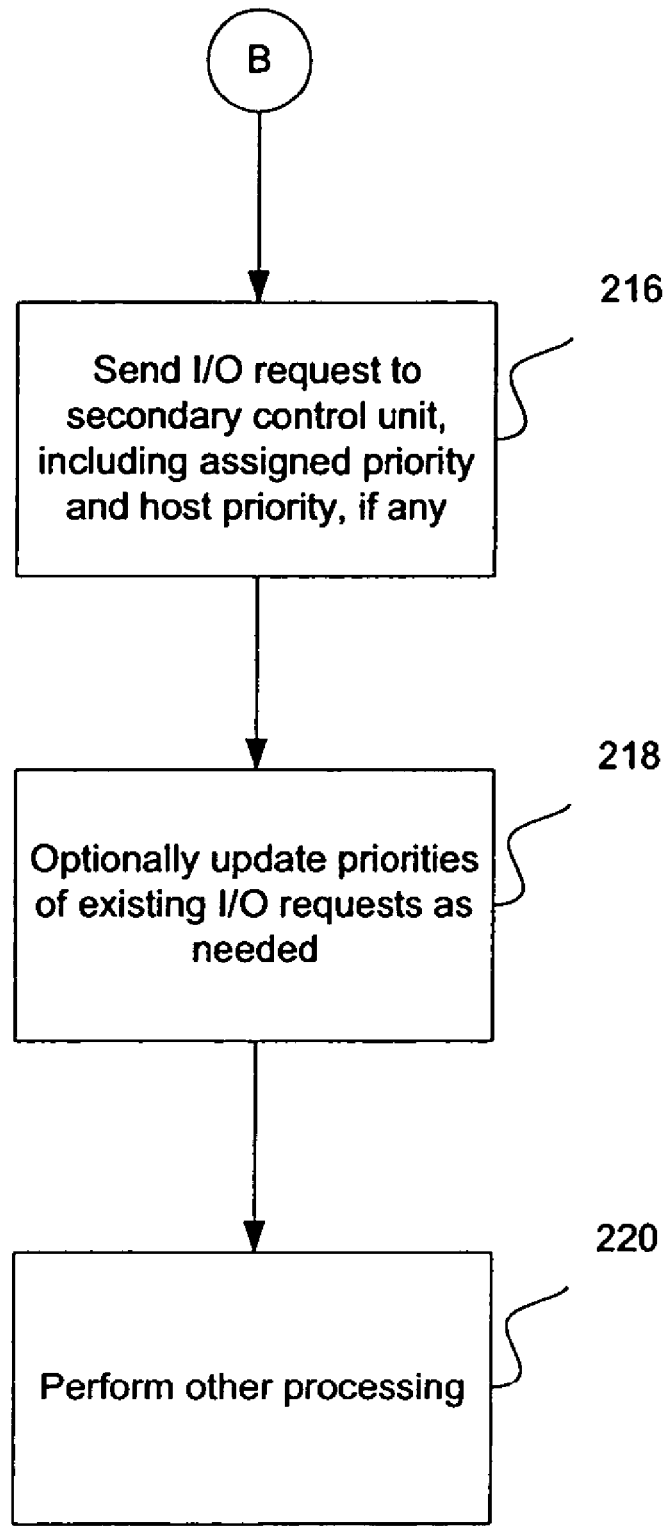

FIGS. 2A, 2B, and 2C illustrate logic implemented in a priority assignment process 110 at a primary control unit 100 in accordance with certain implementations of the invention. For each volume at the primary storage subsystem, there is a corresponding volume at the secondary storage subsystem. At any given time, synchronous copy commands, asynchronous copy commands, and establish with copy commands may be executing concurrently. The priority assignment process 110 assigns a priority based on the I/O type of the I/O request. The priority is used to ensure that host I/O response time is not impacted by establish with copy I/O requests. The priority is also used to prevent synchronous and asynchronous PPRC I/O requests with higher priority from starving establish with copy I/O requests with lower priority.

In FIG. 2A, control begins at block 200 with the priority assignment process 110 receiving an I/O request. In block 202 with the priority assignment process 110 determines whether the I/O request was issued with a synchronous PPRC command. If so, processing continues to block 204, otherwise, processing continues to block 210.

In block 204, the priority assignment process 110 determines whether a host 114 assigned a priority to the I/O request. If so, processing continues to block 206, otherwise, processing continues to block 208. That is, a host 114 may assign each I/O request a priority to be applied to the target of the host for synchronous PPRC.

Figure 3A:
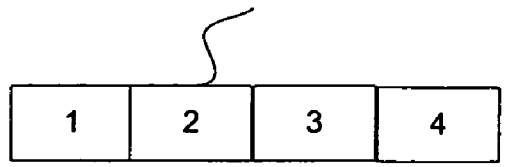
FIGS. 3A, 3B, and 3C illustrate ranges of priorities in accordance with certain implementations of the invention.
Figure 3B:
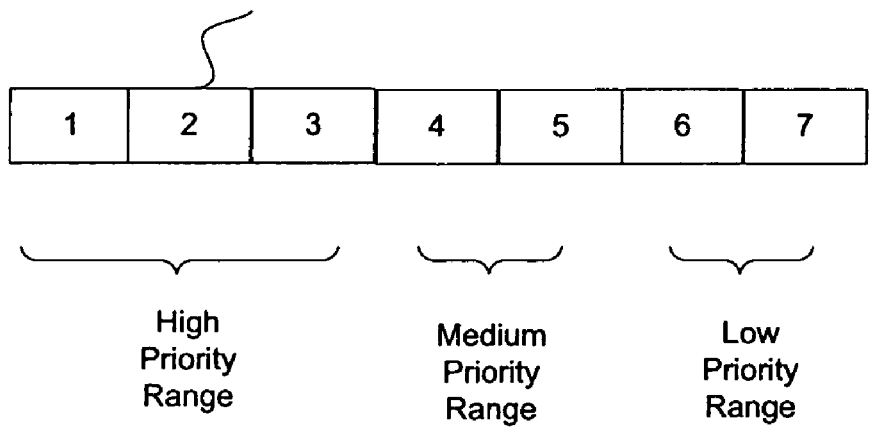
Figure 3C:
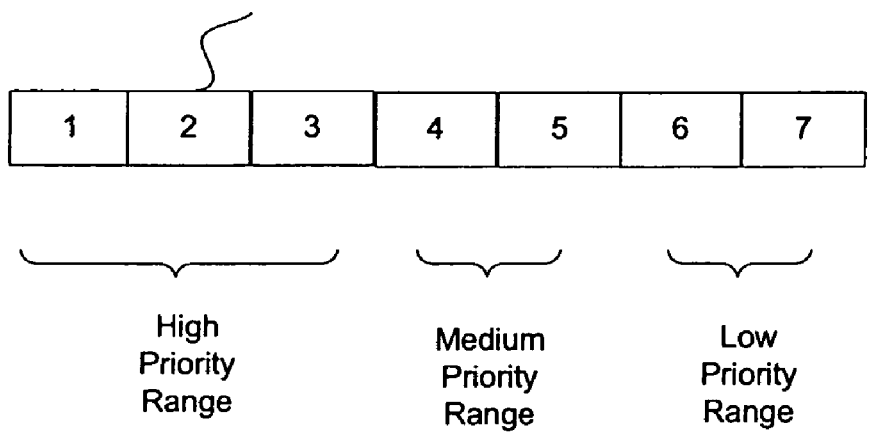

The host 114 assigns a priority from a range of priorities. FIG. 3A illustrates ranges of priorities used by host 114 in accordance with certain implementations of the invention. Range 300 represents possible priority values that a host 114 may assign to an I/O request. In this example, the values range from 1 to 4, with 1 being the highest priority. FIG. 3B illustrates ranges of priorities used by primary control unit 100 in accordance with certain implementations of the invention. Range 310 represents possible priority values that the priority assignment process 110 may assign to an I/O request. In this example, priorities 1, 2 and 3 are in the high priority range; priorities 4 and 5 are in the medium priority range; and, priorities 6 and 7 are in the low priority range.

In block 206, the priority assignment process 110 maps the host priority to a priority within a high priority range. With reference to the example of FIGS. 3A and 3B, the priority assignment process 110 would map any I/O request from host 114 in the high priority range, but the priority assignment process 110 takes into account the host priority and, for example, pending I/O requests and resources at the primary control unit 100, when mapping to a particular priority value (e.g., 1, 2, or 3). For example, if an establish with copy command was being performed for data that the host I/O request was attempting to update, that copy command would have to be completed before the host I/O request is processed. Therefore, in this case, the host I/O request may be assigned a priority of 3. Additionally, if needed, the priority of the establish with copy command may be increased so that the establish with copy command finishes more quickly (block 218).

In block 208, the priority assignment process 110 assigns a priority from the high priority range to the I/O request. In block 210, the priority assignment process 110 determines whether the I/O request is for an I/O request issued with an establish with copy command. If so, processing continues to block 212, otherwise, processing continues to block 214. In block 212, the priority assignment process 110 assigns the I/O request a priority from the low priority range based, for example, on pending I/O requests and available resources at the primary control unit 100.

In block 214, for a request issued with an asynchronous PPRC command or an Extended Distance PPRC command, the priority assignment process 110 assigns the I/O request a priority from the medium priority range based, for example, on pending I/O requests and available resources at the primary control unit 100.

In block 216, the priority assignment process 110 sends the I/O request the priority it has assigned and a host priority (if one exists for the I/O request) to the secondary control unit 120. In certain implementations, the priority assignment process 10 stores the priority it has assigned and a host priority (if one exists for the I/O request) in an extended portion of a Command Descriptor Block (CDB), which is embedded in a Fibre Channel Protocol (FCP) command to be sent to the secondary control unit 120.

In block 218, the priority assignment process 110 optionally updates priorities of pending I/O requests as needed. In block 220, the priority assignment process 110 performs other processing.

Both the primary control unit 100 and the secondary control unit 120 allocate resources to handle a request based on the host priority and a priority assigned by the primary control unit 100.

Figure 4:
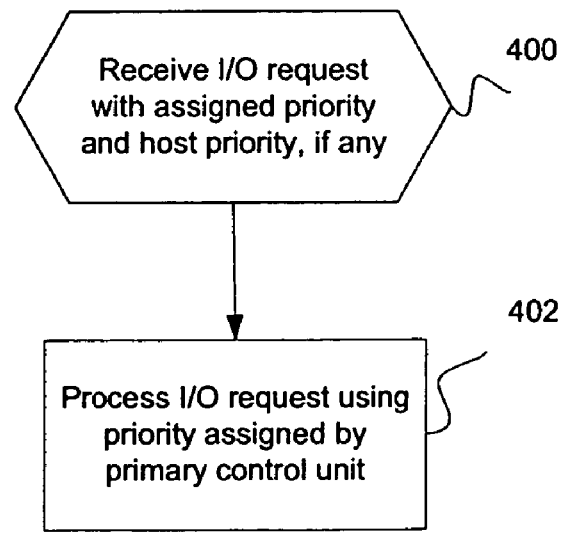
FIG. 4 illustrates logic implemented at a secondary control unit in accordance with certain implementations of the invention.

FIG. 4 illustrates logic implemented at a secondary control unit 120 in accordance with certain implementations of the invention. Control begins at block 400 with the secondary control unit 120 receiving an I/O request with a priority assigned by the priority assignment process 110 at the primary control unit 100 and including a host priority if one exists for the I/O request. In block 402, the secondary control unit 120 processes the I/O request using the priority assigned by the priority assignment process 110 at the primary control unit.

Thus, implementations of the invention provide a technique to apply consistent priorities for handling I/O requests in a primary control unit 110 and secondary control unit 120 by assigning priorities based, at least in part, on I/O types of the I/O requests. Also, for synchronous PPRC, since consistent priority also applies to the host 114 and target (e.g., one or more blocks of data in primary storage 112), the primary and secondary control units 110 and 120 incorporate the priority assigned by the host 114 in handling an I/O request. With consistent priorities applied to all involved control units 110 and 120, I/O response time is reduced and overall system throughput is increased.

IBM, Enterprise Storage Server, and ESCON are registered trademarks or common law marks of International Business Machines Corporation in the United States and/or foreign countries.

Additional Implementation Details

The described techniques for assigning priorities may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, 2C, and 4 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, 2C, and 4 may be implemented in software, hardware, programmable and non-programmable gate array logic or in some combination of hardware, software, or gate array logic.

Figure 5:
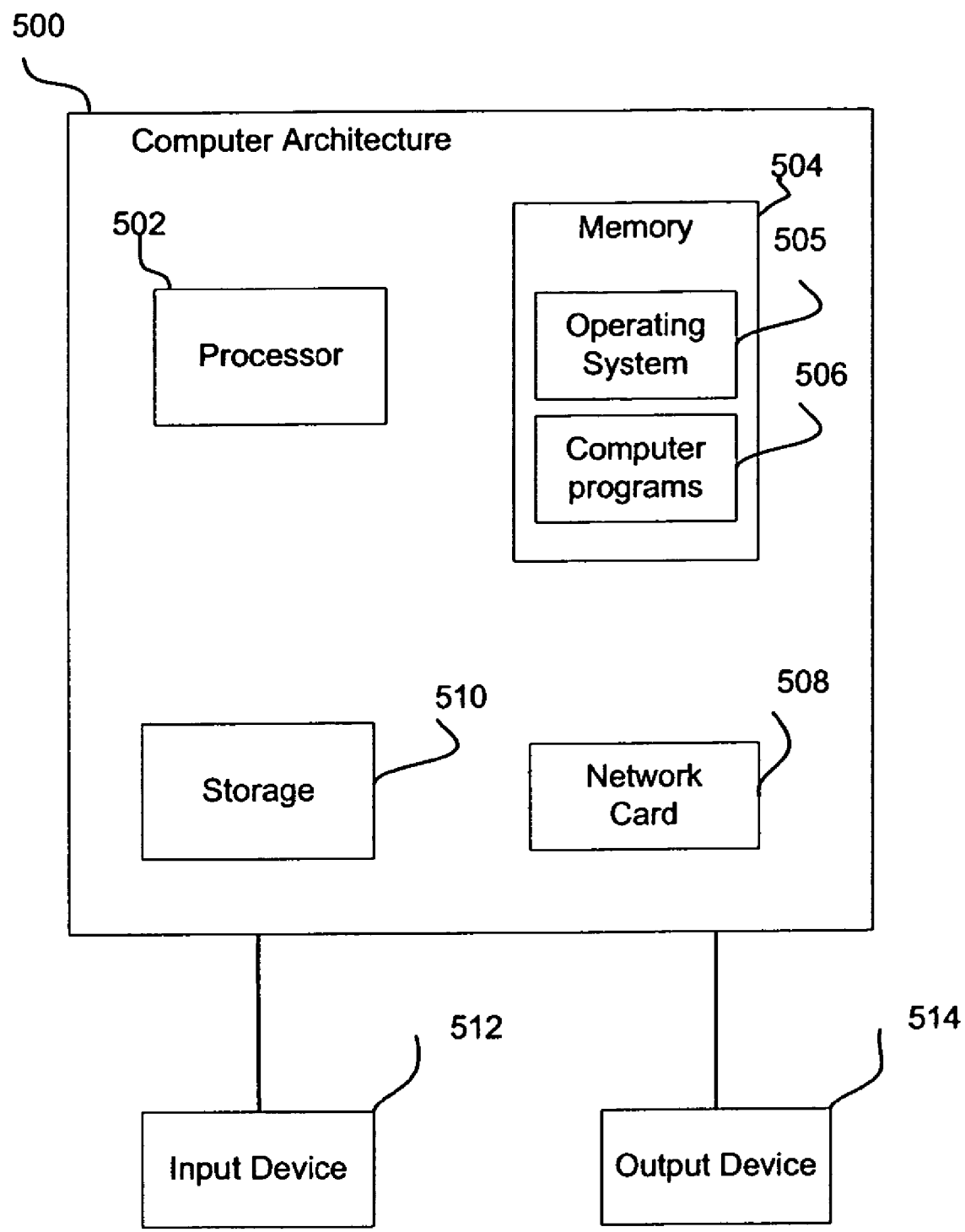
FIG. 5 illustrates one implementation of the architecture of computer systems in accordance with certain implementations of the invention.

FIG. 5 illustrates an architecture 500 of a computer system that may be used in accordance with certain implementations of the invention. Host 114, primary control unit 100, and/or secondary control unit 120 may implement computer architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for assigning priorities, comprising:
under control of a primary control unit,
receiving a request to manipulate data;
determining a type of the request, wherein the type of the request includes a synchronous copy command, an asynchronous copy command, and an establish with copy command;
assigning a priority to the request based on the type of the request by:
assigning the request a high priority when the type of the request is the synchronous copy command and a host has not assigned a priority to the request;
assigning the request a medium priority when the type of the request is the asynchronous copy command; and
assigning the request a low priority when the type of the request is the establish with copy command; and
sending a command to a secondary control unit, wherein the command includes the request and the assigned priority, wherein the primary control unit and the secondary control unit allocate resources to handle the request based on the assigned priority; and
under control of the secondary control unit, using the priority assigned to the request by the primary control unit to process the request.

2. The method of claim 1, wherein the request is issued with a synchronous Peer-to-Peer Remote Copy command and further comprising:
assigning the request a high priority.

3. The method of claim 1, wherein the request is issued with an asynchronous Peer-to-Peer Remote Copy command and further comprising:
assigning the request a medium priority.

4. The method of claim 1, wherein the request is issued with an Extended Distance Peer-to-Peer Remote Copy command and further comprising:
assigning the request a medium priority.

5. The method of claim 1, wherein the request is issued with an establish with copy command and further comprising:
assigning the request a low priority.

6. The method of claim 1, wherein the request is issued with a synchronous Peer-to-Peer Remote Copy command and further comprising:
receiving a host priority with the request; and
mapping the host priority to a priority in a high priority range having multiple priority values based on the host priority, pending Input/Output (I/O) requests, and available resources.

7. The method of claim 1, further comprising:
mapping a host priority based on the host priority and one of pending requests and available resources.

8. The method of claim 1, further comprising:
updating a priority for a pending request.

9. An article of manufacture comprising a computer readable medium storing code for assigning priorities, wherein the code is executed on a processor of a computer and causes operations to be performed, the operations comprising:
under control of a primary control unit,
receiving a request to manipulate data;
determining a type of the request, wherein the type of the request includes a synchronous copy command, an asynchronous copy command, and an establish with copy command;
assigning a priority to the request based on the type of the request by:
assigning the request a high priority when the type of the request is the synchronous copy command and a host has not assigned a priority to the request;
assigning the request a medium priority when the type of the request is the asynchronous copy command; and
assigning the request a low priority when the type of the request is the establish with copy command; and
sending a command to a secondary control unit, wherein the command includes the request and the assigned priority, wherein the primary control unit and the secondary control unit allocate resources to handle the request based on the assigned priority; and
under control of the secondary control unit, using the priority assigned to the request by the primary control unit to process the request.

10. The article of manufacture of claim 9, wherein the request is issued with a synchronous Peer-to-Peer Remote Copy command and wherein the operations for assigning further comprise:
assigning the request a high priority.

11. The article of manufacture of claim 9, wherein the request is issued with an asynchronous Peer-to-Peer Remote Copy command and wherein the operations for assigning further comprise:
assigning the request a medium priority.

12. The article of manufacture of claim 9, wherein the request is issued with an Extended Distance Peer-to-Peer Remote Copy command and wherein the operations for assigning further comprise:
assigning the request a medium priority.

13. The article of manufacture of claim 9, wherein the request is issued with an establish with copy command and wherein the operations for assigning further comprise:
assigning the request a low priority.

14. The article of manufacture of claim 9, wherein the request is issued with a synchronous Peer-to-Peer Remote Copy command and wherein the operations further comprise:
receiving a host priority with the request; and
mapping the host priority to a priority in a high priority range having multiple priority values based on the host priority, pending Input/Output (I/O) requests, and available resources.

15. The article of manufacture of claim 9, wherein the operations further comprise:
mapping a host priority based on the host priority and one of pending requests and available resources.

16. The article of manufacture of claim 9, wherein the operations further comprise:
updating a priority for a pending request.

17. A system for assigning priorities, comprising:
under control of a primary control unit, hardware logic for:
receiving a request to manipulate data;
determining a type of the request, wherein the type of the request includes a synchronous copy command, an asynchronous copy command, and an establish with copy command;
assigning a priority to the request based on the type of the request by:

assigning the request a high priority when the type of the request is the synchronous copy command and a host has not assigned a priority to the request;

assigning the request a medium priority when the type of the request is the asynchronous copy command; and assigning the request a low priority when the type of the request is the establish with copy command; and sending a command to a secondary control unit, wherein the command includes the request and the assigned priority, wherein the primary control unit and the secondary control unit allocate resources to handle the request based on the assigned priority; and under control of the secondary control unit, using the priority assigned to the request by the primary control unit to process the request.

18. The system of claim 17, wherein the request is issued with a synchronous Peer-to-Peer Remote Copy command and wherein the hardware logic for assigning further comprises:
assigning the request a high priority.

19. The system of claim 17, wherein the request is issued with an asynchronous Peer-to-Peer Remote Copy command and wherein the hardware logic for assigning further comprises:
assigning the request a medium priority.

20. The system of claim 17, wherein the request is issued with an Extended Distance Peer-to-Peer Remote Copy command and wherein the hardware logic for assigning further comprise:
assigning the request a medium priority.

21. The system of claim 17, wherein the request is issued with an establish with copy command and wherein the hardware logic for assigning further comprise:
assigning the request a low priority.

22. The system of claim 17, wherein the request is issued with a synchronous Peer-to-Peer Remote Copy command and wherein the hardware logic further comprises:
receiving a host priority with the request; and
mapping the host priority to a priority in a high priority range having multiple priority values based on the host priority, pending Input/Output (I/O) requests, and available resources.

23. The system of claim 17, wherein the hardware logic further comprises:
mapping a host priority based on the host priority and one of pending requests and available resources.

24. The system of claim 17, wherein the hardware logic further comprises:
updating a priority for a pending request.

* * * * *

UNITED STATES PATENT AND TRADEMARK OFFICE
CERTIFICATE OF CORRECTION

| | | |
|---|---|---|
| PATENT NO. | : 7,650,385 B2 | Page 1 of 1 |
| APPLICATION NO. | : 10/719071 | |
| DATED | : January 19, 2010 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1445 days.

Signed and Sealed this

Twenty-third Day of November, 2010

David J. Kappos
*Director of the United States Patent and Trademark Office*